June 30, 1925.
G. C. VOWELL
1,544,509
SPRAYING MACHINE
Filed July 19, 1923
4 Sheets-Sheet 1
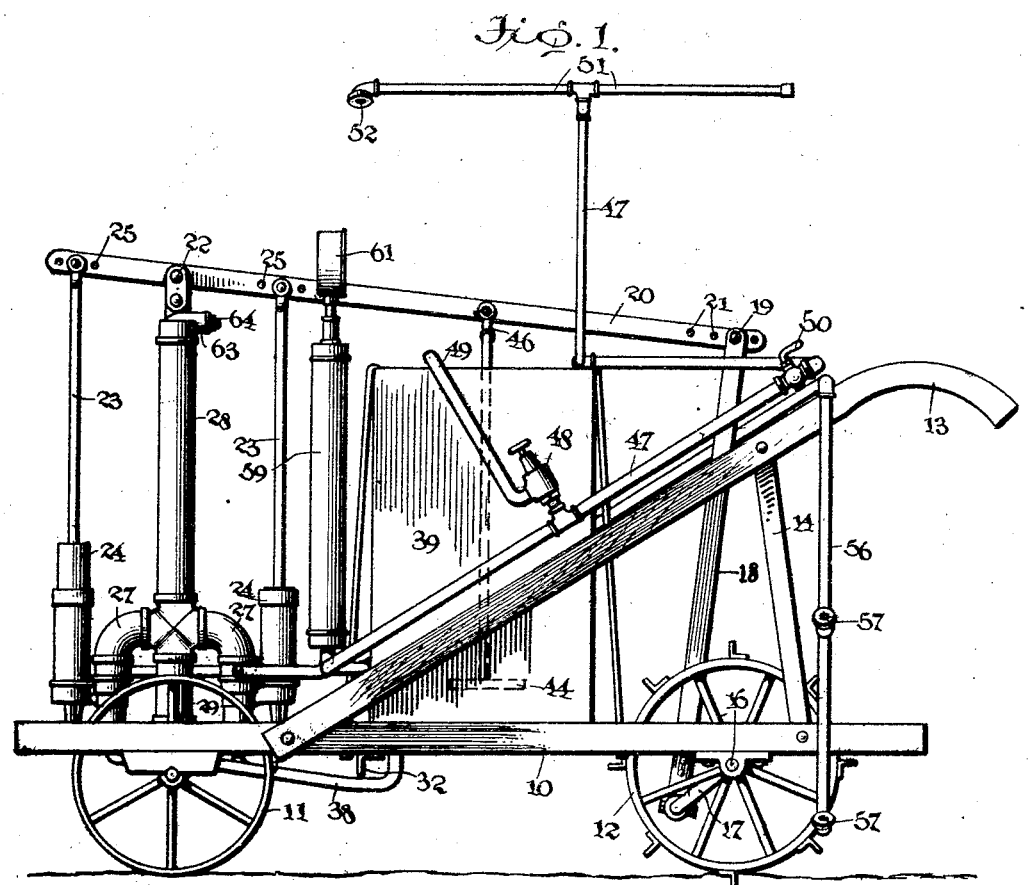
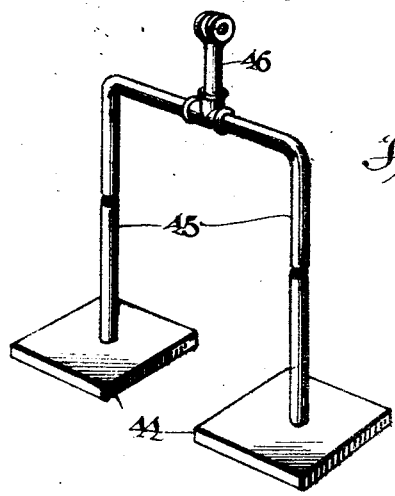
Inventor
G. C. Vowell,
By *[signature]*
Attorney

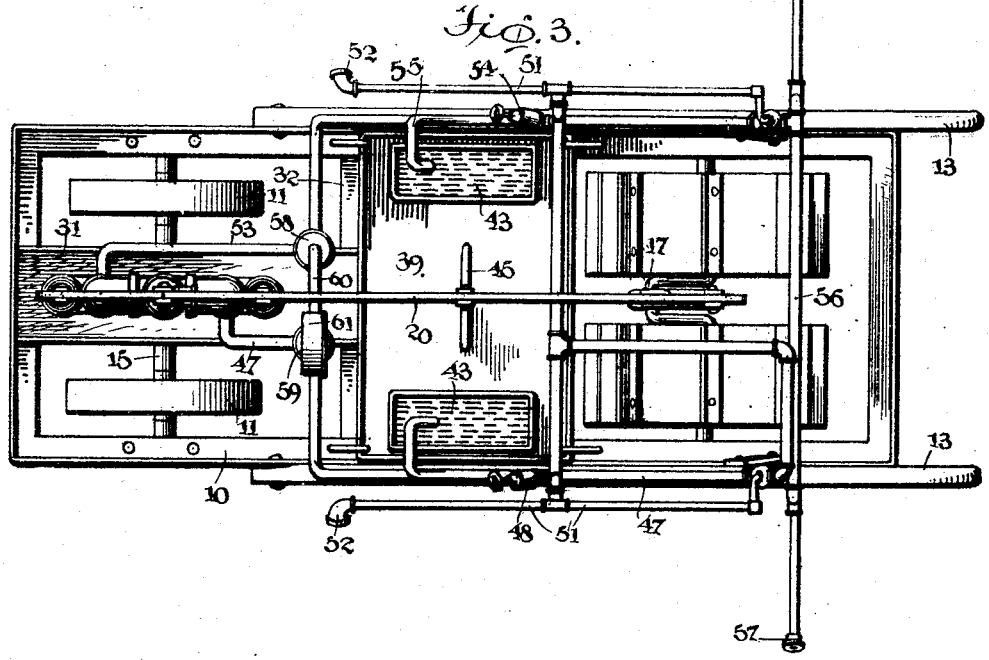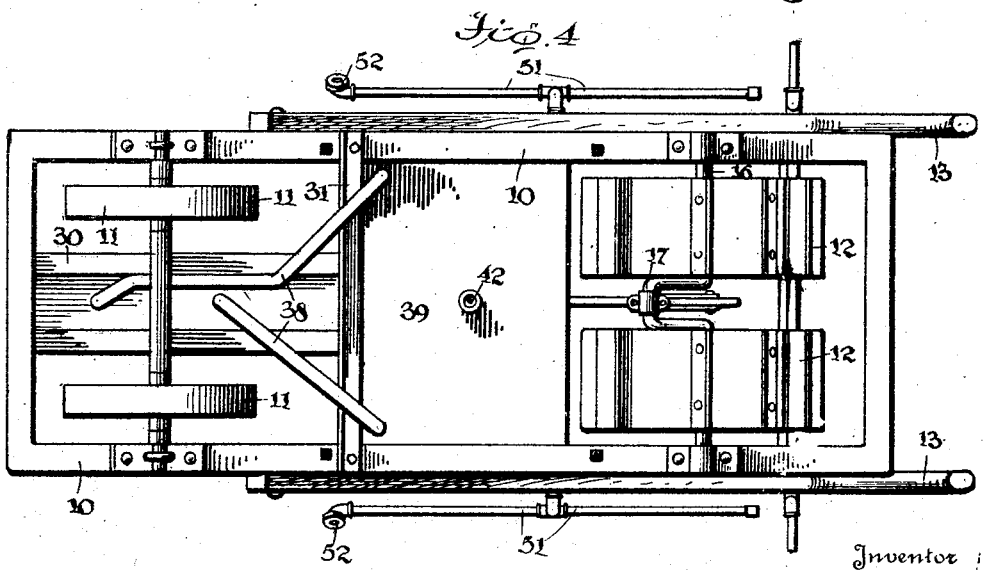

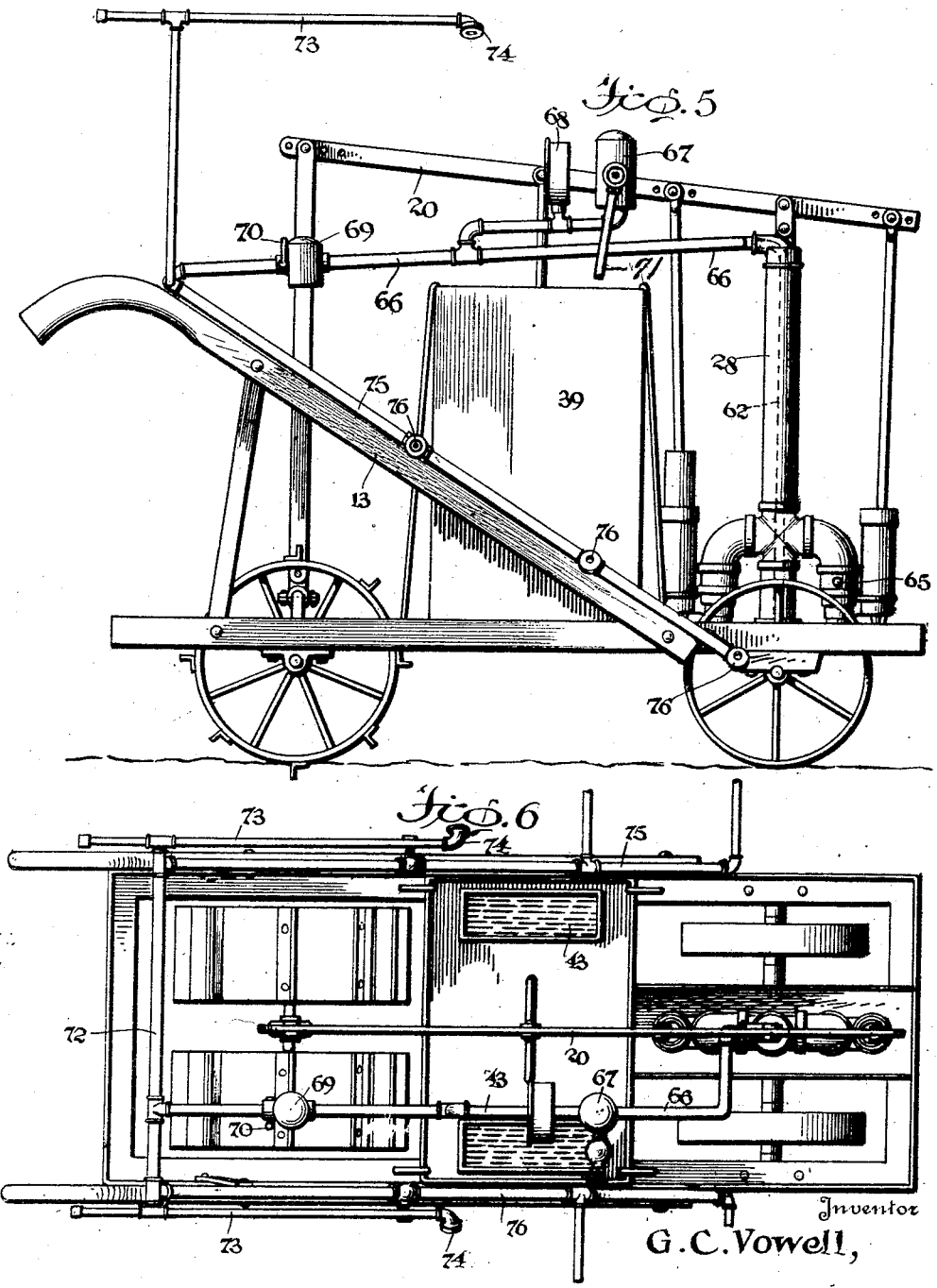

June 30, 1925. 1,544,509
G. C. VOWELL
SPRAYING MACHINE
Filed July 19, 1923 4 Sheets-Sheet 4
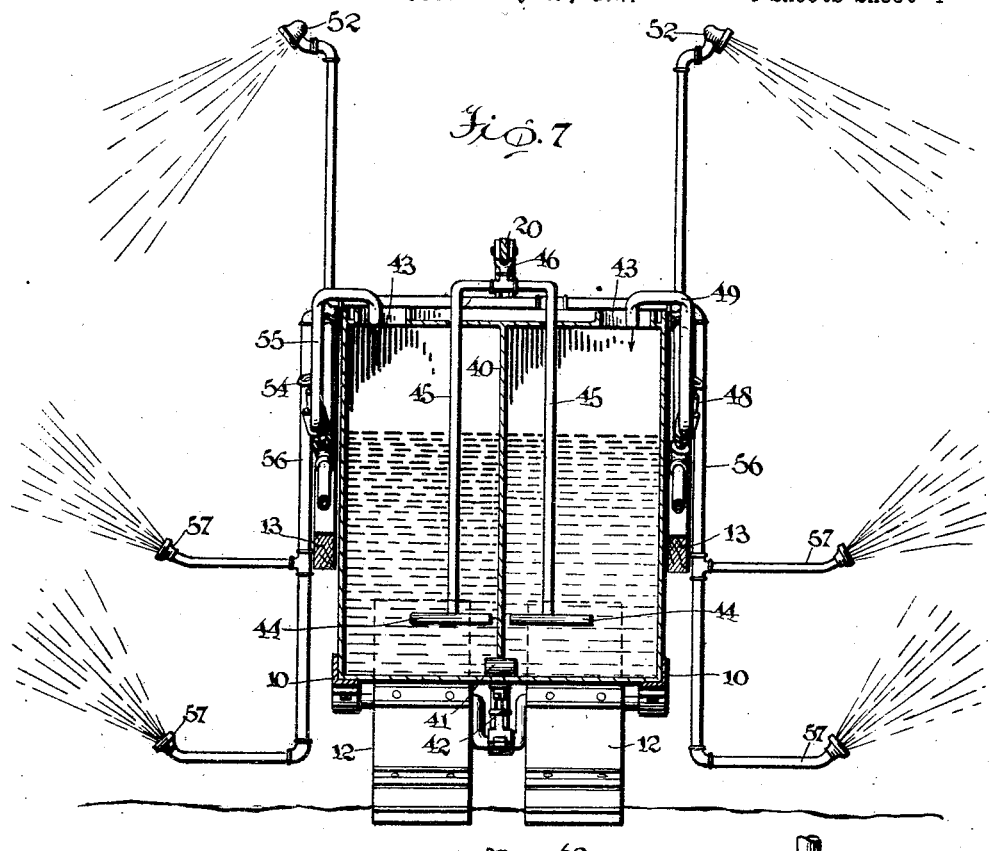
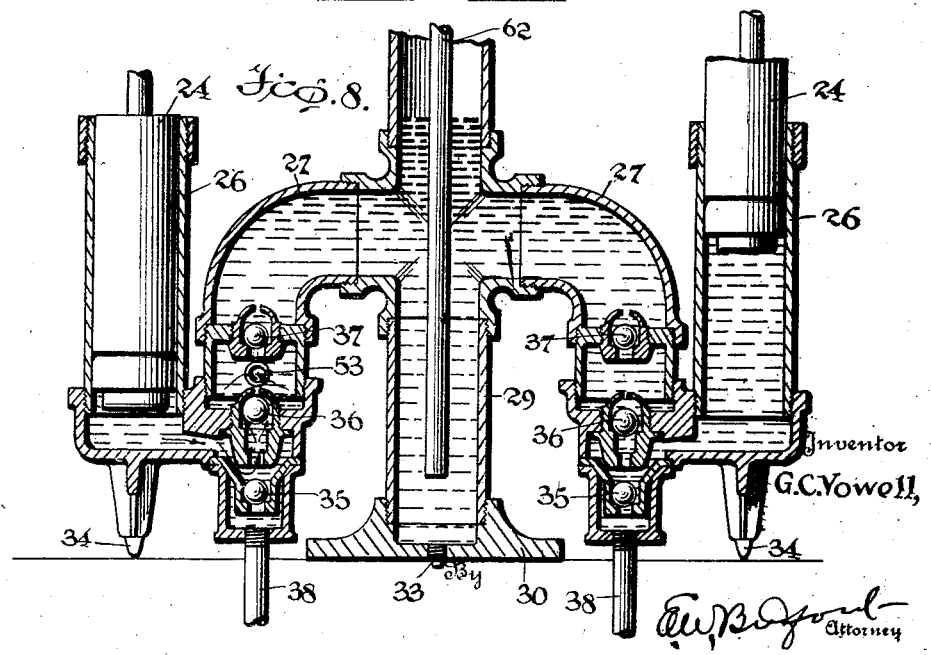
Inventor
G. C. Vowell
Attorney Patented June 30, 1925.

1,544,509

UNITED STATES PATENT OFFICE.

GROVER C. VOWELL, OF ELLENTON, FLORIDA, ASSIGNOR OF ONE-HALF TO W. H. BROWN, OF MANATEE COUNTY, FLORIDA.

SPRAYING MACHINE.

Application filed July 19, 1923. Serial No. 652,569.

*To all whom it may concern:*

Be it known that I, GROVER C. VOWELL, a citizen of the United States, residing at Ellenton, in the county of Manatee and State of Florida, have invented certain new and useful Improvements in Spraying Machines, of which the following is a specification.

My said invention relates to a machine for spraying plants and it is an object of the same to provide a convertible machine by means of which a single solution may be applied to plants either at a certain predetermined height or over the entire plant, or on the other hand by means of which distinct and separate solutions may be applied at different heights to the plants. The latter process is of special utility in the case of such plants as tomatoes which are usually staked. It is desirable in spraying tomato vines to apply an insecticide to the upper part of the vines where the new leaves and bloom pods are found, this being for the reason that these parts are the most subject to attack by eating insects such as worms. The principal damage is done by the worms in the first few days of their existence after which they commonly enter the larger fruits where they can not be reached by poison. The insecticide in common use is arsenate of lead and it is undesirable to apply this to the lower parts of the plant both because of its white color which stains the ripening tomatoes and renders them less saleable and also for the reason that this insecticide is poisonous and liable to do injury to the consumer of the tomato if ingested in sufficient quantities. Fungicides however should be applied to all parts of the plants and especially to the older and lower leaves. The device of my invention is so constructed as to enable the user to apply simultaneously an insecticide to the young and tender parts of the plants where the worms are found and a fungicide to the entire plant or to the lower parts only. Another reason why this is desirable is that it results in a smaller consumption of lead arsenate and consequently is more economical than sprayers that apply the solution to the entire plant.

Another object of the invention is to provide a sprayer with a plurality of pumps each having two single acting cylinders whereby the machine may be made to work on two or more cylinders while others remain idle thus adapting it for use on either large or small crops by varying the amount of solution ejected from the machine. This is also a matter of convenience in that one or more cylinders may be placed out of operation while the said cylinders or their valves are repaired or replaced. This can be done without halting the operation of the machine and as the cylinders and valves are the only parts liable to wear out excepting certain bushings on the axles, etc., the machine may be kept substantially in constant operation during the season when it is needed.

Referring to the accompanying drawings, which are made a part hereof and on which similar reference characters indicate similar parts, Figure 1 is a side elevation of one form of my sprayer, Figure 2, a detail of a stirrer used in the supply tank, Figure 3, a top plan of the device, Figure 4, a bottom plant of the same, Figure 5, a side elevation of a modified form of the invention, Figure 6, a top plan of the same, Figure 7, a transverse section of a supply tank, and Figure 8, a transverse section of the pumps.

In the drawings reference character 10 indicates the horizontal main frame of the machine, this being in the shape of a rectangular structure of channel iron here shown as consisting of an L-bar which may be bent into the shape indicated or may have separate sides and ends secured together in any convenient manner. This frame is supported by front wheels 11 and rear wheels 12 and as here shown is arranged to be drawn by a horse. Handles 13 are secured at their lower ends to side members of the frame and braces 14 extend from a point near the other end of the frame to the handles.

The front wheels are mounted on a common axle 15 about which they revolve freely and the rear wheels are fixed to a crankshaft 16, the crank shaft 16 having midway of its length a crank 17 on which is journaled a connecting rod 18 having at its upper end a pivot 19 by which it is adjustably secured to a walking beam 20, said walking beam having a number of holes 21 at its rear end for this purpose. The walking beam 20 is pivoted at 22 and is connected at opposite sides of its pivot to two rods 23 having secured thereto at their lower ends the pistons 24 of a pair of pumps. The connection between the walking beam and the rods 23 is made adjustable by means of holes 25 in the walking beam.

The pistons 24 operate in a pair of cylinders 26. At their lower ends the cylinders have passages leading to a pair of chambers 27 which unite at their upper ends to form a single elongated main pressure head 28 at the top of which the walking beam is pivoted. The main pressure head has a downward extension 29 leading into a pedestal 30 standing on a support 31 mounted at one end on the inner limb of the L-beam at the end of the main frame and at the other end on a cross bar 32. This cross-bar is shown in Figure 1 as an inverted L-bar. A plug 33 closes a drain opening in the lower end of the pedestal 30.

The pump cylinders have downward extensions 34 also resting on the support 31 to provide a firm and rigid mounting for the pumps. The passages between the pump cylinders and the pressure heads are provided with a series of valves 35, 36 and 37 and inlet pipes 38 are provided beneath the lowermost valves, said inlet pipes leading from a supply tank 39 also carried by the main frame.

The supply tank 39 has a central partition 40 by which it is divided into two separate compartments. At the lower end of the partition the compartments are connected by a length of pipe 41 provided with a valve 42. When it is desired to use a single solution in the tank the valve may be opened but otherwise it is closed to render the compartments independent of each other. Each compartment has a separate outlet pipe 38, above referred to, a separate opening 43 and a separate stirrer 44, the stirrers being carried by rods 45 connected at their upper ends to a yoke 46 secured to the walking beam 20.

A pipe 47 leads from one of the pumps, said pipe having a check valve 48 and a pipe 49 leading therefrom to the one of said tank compartments from which the pump draws its solution. The purpose of the check valve is to permit the spraying solution to return to the tank in case of excessive pressure due to over-supply by the pump or to any other cause. Beyond the check valve the pipe has a manually operated valve 50 near the rear of the machine by which the operator may regulate the flow to the nozzle or nozzles, the remainder of the fluid supplied by the pump passing back through the check valve 48. The pipe extends forward and has branches extending laterally and then upward to an upper horizontal pipe section 51 extending alongside of the machine and each provided with one or more nozzles 52 for distributing the spray.

A pipe 53 leads from the other pump this pipe having a check valve 54 and a return pipe 55 similar in construction and operation to those already described and extending rearwardly and upwardly alongside the machine. At its upper end it is connected to a transverse pipe 56 bent downward at its ends and provided at each side of the machine with a plurality of nozzles 57 at different heights from the ground. At an intermediate point the pipes 47 and 53 are provided respectively with auxiliary pressure heads 58 and 59 connected at their upper ends by a pipe 60. An indicator 61 is located above the auxiliary head 59 and is connected to the pipe 60 so as to provide a common indication for the pressure in the auxiliary heads.

The main pressure head 28 is provided with a central pipe 62 located centrally thereof and connected at the upper end of the head to a fixed nose 63 closed by a plug 64. At its lower end this pipe extends nearly to the bottom of the main pressure chamber as shown in Figure 8.

In the operation of the machine it will be moved by a horse or other power between the rows of plants and the rear wheels will thereupon be revolved, they being provided with cross ribs to insure such revolution and prevent sliding along the ground. The rotation of the wheels through the crank 17, the connecting rod 18 and the walking beam 20 will operate the stirrers 44 in each tank to keep the solution stirred up and will also actuate alternately the respective pistons 24 in the two pumps. Each piston in its reciprocation draws the liquid from its respective tank compartment upward through pipe 38 and valve 35, then on its down stroke forces it up through valves 36 and 37 and into the pressure chambers 27 and 28.

At the beginning of the operation of the device this action will continue until the pressure is equalized in the upper part of the pressure chambers 28, 58 and 59 after which the valves 37 will close. When the valves 37 are closed the solution drawn from the tank by each pump will, as will be evident, remain entirely separate and distinct from the mixture in the pressure chambers 27 and 28 and will pass through the pipe 47 and its connections to the nozzles 52, or through the pipe 53 and its connections to the nozzles 57 as the case may be, thus being applied either to the upper parts of the plants only or to the lower parts thereof, all as will be apparent on consideration of Figure 7.

In case a single solution is to be used valve 42 may be opened so that the liquid may pass freely from one chamber to the other and in this case the pressure supply may be poured into either compartment whereas otherwise each compartment has its own supply opening and the excess furnished by the pumps over that which is allowed to pass through the nozzles by adjustment of valves 50 and 54 returns to each respective tank through the respective pipes 49 and 55.

In the modified form of the invention shown in Figure 5 I have illustrated a machine which may be made up and sold separately for use where only a single solution is desired but as will be seen from consideration of the drawings this form may also be a convertible form of that above described. The pipes 47 and 53 have, however, been removed from the machine and the openings from the pressure chambers closed by plugs 65. In place of the pipes 47 and 53 a pipe 66 has been connected to the nose 63, the plug 64 being removed. This pipe has a branch leading to a pressure chamber 67 and also carrying an indicator 68. A pressure valve 69 may be located on the pipe adjacent to a manually operable valve 70 by means of which the flow of the solution may be regulated as in the form first described, the excess being returned to the tank by a branch pipe 71. At its rear end the pipe 66 leads into a cross pipe 72 and this has upward extensions at its ends supporting pipes 73 provided with nozzles 74 at each side of the machine. The cross pipe 72 also has branches 75 extending diagonally downward along the handles 13 and supporting nozzles 76 at various elevations.

In the use of the modified or convertible form of the machine it will be seen that the operation of the device as above described will cause the solution in the tank to be drawn through pipes 38 and valves 35, then forced through valves 36 and 37 into chambers 27, thence into the main chamber 28 through pipe 62, nose 63, pipes 66, 72, 73 and 75 to the various nozzles 74 and 76 thereby applying a spray to the entire plants at one side thereof. The spraying action may then be controlled according to the size of the plants and other exigencies of the case by regulating the flow by adjustment of valves 70 and 69 and also by eliminating the action of one or more of the nozzles, if desired, in any conventional manner as by removing the nozzle and plugging the opening.

My spraying device is intended primarily for the use of truck growers and is especially advantageous for such use for the reasons that it is easy to operate and that it will not turn over easily, that it is simple, strong and durable; that it is easily repaired and devoid of all useless and cumbersome parts; that it is narrow enough to pass between the rows of such vegetables as tomatoes, peppers, egg plants, celery, beans, etc., when planted in the ordinary manner and it is of sufficient capacity to maintain a high pressure on a sufficient number of nozzles to cover the entire surface of large plants at a single operation or in a single trip along the row.

It will be obvious to those skilled in the art that various other modifications will be made in my machine without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A convertible spraying device comprising containers for a variety of liquid supplies, a plurality of pumps, a chamber having compartments in communication with the respective pumps and the containers appurtenant thereto, a plurality of outlets leading from said chamber, nozzles adapted to be connected to said outlets, and means for closing the outlets selectively whereby two fluids may pass independently through said chamber to different nozzles, or a single fluid only may be used, substantially as set forth.

2. In a spraying apparatus, containers for different liquids, pumping means connected to the containers, a branching pressure chamber connected to the pumping means, outlets from the branches of the chamber for leading off the different liquids independently, and another outlet from the chamber for leading off a mixture of liquids, in the containers substantially as set forth.

3. In a spraying apparatus, containers for different liquids, pumping means connected to the containers, a branching pressure chamber connected to the pumping means, outlets from the branches of the chamber for leading off the different liquids independently, and another outlet from said chamber for leading off a mixture of liquids said outlets being located intermediate the first-named outlets, substantially as set forth.

4. In a spraying apparatus, containers for different liquids, independent pumps connected to said containers, a pressure chamber common to said pumps, outlets from said chamber adjacent the respective pumps for leading off the fluids independently, and an intermediate outlet from said chamber for leading off a mixture of said fluids, substantially as set forth.

5. In a fluid sprayer, a pair of pumps, a common pressure head for said pumps, a tank comprising a plurality of separate containers, connections between the pumps, the containers and the head for spraying solutions in different containers separately, a stirrer for each container, a lever pivoted on said tank, and operating connections from said lever to said pumps and said stirrers, substantially as set forth.

6. In a fluid sprayer, a pair of pumps, a common pressure head for said pumps, a tank comprising a plurality of separate containers, connections between the pumps, the containers and the head for spraying fluids in different containers separately, a stirrer for each container, a lever pivoted on said tank, operating connections from said lever to said pumps and said stirrers, a wheeled frame for the device, a crankshaft carrying the rear wheels thereof, and a connecting rod between the crankshaft and said lever for operating the same, substantially as set forth.

7. In a spraying device, a wheeled frame, a supply tank on the frame having independent compartments, independently acting pumps for individual compartments, a set of fixed nozzles adapted to spray the lower portions of plants at one side of the machine, connections leading thereto from one of said pumps, a set of fixed elevated nozzles for discharging at the same side of the machine, connections leading thereto from another one of said pumps, and interconnected means for operating said pumps, substantially as set forth.

8. In a spraying apparatus for plants, a plurality of containers, sets of nozzles at different levels on the same side of the device, pumping means connecting different containers to the respective sets of nozzles whereby different spraying solutions may be applied simultaneously at different levels to the same side of a series of plants, and common means for operating said pumping means, substantially as set forth.

9. A convertible spraying machine having a plurality of pumps, independent supplies of spraying solution for the respective pumps, a common pressure head connected to said pumps, an outlet from said head, closure means for said outlet, outlets from said pumps independent of said head, closure means for said last-named outlets, and nozzles adapted to be alternatively connected with said first-named or said second-named outlets, substantially as set forth.

10. In a spraying machine, means for applying a spray to the lower parts of a series of plants, means fixed in relation to said first-named means for simultaneously applying a spray to the same side of said plants at a higher level, and means coordinated in operation for supplying fluids of different character to the respective spraying means, substantially as set forth.

In witness whereof, I have hereunto set my hand and seal at Ellenton, Florida, this 11th day of July, A. D. nineteen hundred and twenty-three.

GROVER C. VOWELL

Witnesses:
J. J. LUKE,
E. B. C. NICHOLS.